United States Patent [19]

Butler

[11] Patent Number: 5,091,960
[45] Date of Patent: Feb. 25, 1992

[54] HIGH-SPEED IMAGE RENDERING METHOD USING LOOK-AHEAD IMAGES

[75] Inventor: Timothy L. Butler, Plano, Tex.

[73] Assignee: Visual Information Technologies, Inc., Plano, Tex.

[21] Appl. No.: 249,589

[22] Filed: Sep. 26, 1988

[51] Int. Cl.$^5$ .................. G06K 9/00; G06F 15/00
[52] U.S. Cl. ........................ 382/1; 340/729; 382/41; 395/100
[58] Field of Search ............ 340/729; 364/522; 434/43; 382/1, 41

[56] References Cited

U.S. PATENT DOCUMENTS

| | | | |
|---|---|---|---|
| 4,475,104 | 10/1984 | Shen | 340/729 |
| 4,682,160 | 7/1987 | Beckwith, Jr. et al. | 340/729 |
| 4,717,962 | 1/1988 | Moore | 358/260 |
| 4,766,556 | 8/1988 | Arakawa | 340/729 |
| 4,947,347 | 8/1990 | Sato | 364/522 |
| 4,952,922 | 8/1990 | Griffin et al. | 340/729 |

OTHER PUBLICATIONS

Scott D. Roth, "Ray Casting for Modeling Solids", *Computer Graphics & Image Processing*, vol. 18, No. 2, Feb., 1982, pp. 109-144.

Levoy, Marc, "Volume Rendering-Display of Surfaces from Volume Data", IEEE Computer Graphics and Application, May 1988, pp. 29-37.

*Primary Examiner*—Leo H. Boudreau
*Attorney, Agent, or Firm*—Baker & Botts

[57] ABSTRACT

A look-ahead image is employed during ray tracing of the image rendering process to eliminate the processing of pixels which are of no interest within a given boundary of the ray. During rendering, ray tracing is carried out by jumping over the pixels of no interest to thereby enhance the rendering speed.

58 Claims, 4 Drawing Sheets

HIGH-SPEED IMAGE RENDERING METHOD USING LOOK-AHEAD IMAGES

BACKGROUND OF THE INVENTION

High-speed image processing equipment has made possible the processing of image data to present new scenes or perspectives of an object from image data of a different scene or perspective. For example, digital elevation information of a geographical region can be processed to generate a variety of different two and one-half dimensional representations of the terrain. The new perspective scenes of the terrain can be generated by rendering techniques to give the observer a perspective view of the terrain from any point in space. From a series of such perspective views of the subject terrain, a person can experience a hypothetical flight over the terrain without actually experiencing a true flight. It can be appreciated that such a rendering technique is highly advantageous in military and aeronautical applications.

Image data related to three-dimensional objects may also be rendered to further define, clarify, create, etc., new images which in reality are difficult or impossible to observe. Such applications include physiological cat-scans, X-rays, sonograms, nuclear magnetic resonance, etc. Given such three-dimensional image data, perspective views can be generated using translucency, opacity or color parameters to create new perspective views to accentuate body tissues or other material.

Image rendering can be achieved by various techniques, including image ray tracing. Ray tracing techniques are disclosed in connection with volume rendering in the technical article entitled, "Display of Surfaces From Volume Data", by Marc Levoy, IEEE, Computer Graphics and Applications, May, 1988 pages 29–37. According to such techniques, and other similar ray tracing techniques, point is established in free space from which hypothetical rays are extended toward a reflective image of the object. In two and one-half dimensional ray tracing, the image processor proceeds in successive increments along each ray to determine if the surface of the object has been penetrated. Each ray increment or section corresponds to a pixel location associated with the reflective image. When the surface of the image is penetrated by a particular ray section, the pixel information or resampled information thereof, is stored for later presentation of the new perspective view.

According to three-dimensional image ray tracing, each ray is also incrementally traversed, noting whether any point of interest is within a specified volumetric vicinity. Regions of interest may include arbitrary intensity ranges or opacity ranges existing within a given sphere in which the ray section is centered.

One shortcoming of conventional image ray tracing is the time consumed in performing the rendering operation. The increments by which each ray is traced are generally small. Because information for a large number of pixels must be processed at each point along the ray, the processing time of all the rays can become enormous. For example, in rendering a typical terrain object in two and one-half dimensions, the rendering can take ten to fifteen minutes depending upon the complexity of the base reflective image. Because a three-dimensional rendering involves cubic dimensions, rendering of associated images may take even longer. Hence, it can be seen that a need exists for an improved technique which reduces the time to carry out a rendering operation. A further need exists for a new rendering operation which is faster than current techniques, but which does not compromise the quality of the resultant perspective view.

SUMMARY OF THE INVENTION

In accordance with the present invention, the disclosed rendering method and associated apparatus substantially reduces or eliminates the disadvantages and shortcomings associated with the prior art techniques. According to the invention, the reflective data of the image is preprocessed before rendering to develop one or more look-ahead images which are referenced during the actual rendering process. Rather than proceed along each ray in a traditional single step manner, the method and apparatus of the invention determines how far along the ray one can proceed first by large steps and then by smaller steps to encounter pertinent image data without passing or overlooking other significant image data. The jumps by which one can proceed along each ray without bypassing pertinent image data are determined at any point along the ray by referring to the look-ahead image. Preferred embodiments are disclosed for both 2.5 and 3 dimensional rendering.

Various predefined large jumps are executed to determine, in 2.5 dimensional applications, if the surface of the object has been penetrated. If so, smaller and smaller jumps are executed so that the spatial determination of the object surface can be approached without resorting to the conventional successive small incremental steps along the ray.

In a preferred embodiment of the invention, a first look-ahead image is developed by preprocessing the reflective image data to determine, for each ray, whether or not a single jump, equal to many small increments, can be executed and yet not penetrate the object surface. If so, a digital notation is stored in the look-ahead image to indicate that such a large jump can be accomplished thereby eliminating the many small individual jumps which would otherwise be processed. If a single large jump cannot be accomplished without penetrating the object surface, then the preprocessing method causes an execution of an intermediate jump equal to several small increments. A determination is again made to ascertain if the image surface is thereby penetrated. If not, a second or intermediate look-ahead image stores therein a predefined notation corresponding to the pixel information associated with the ray section which penetrated the surface. If the intermediate step does penetrate the object surface, then the smallest increments are executed using the elevation image data itself to determine exactly in three dimensional space where the object's surface exists along the ray. In essence, three look-ahead images are provided, one being the actual elevation image data itself.

For three-dimensional rendering, large and intermediate jumps along each ray are also carried out using the minimum distance to a particular type or quality of pixel. If no pixel of such type or quality exists within a sphere centered about the start point of a jump along a ray, then the look-ahead image data is set to maximum distance value.

BRIEF DESCRIPTION OF THE DRAWINGS

Further features and advantages will become apparent from the following and more particular description of the preferred embodiment of the invention, as illustrated in the accompanying drawings in which like reference characters generally refer to the same parts or functions throughout the views, and in which.

DETAILED DESCRIPTION OF THE INVENTION

Figure 1:
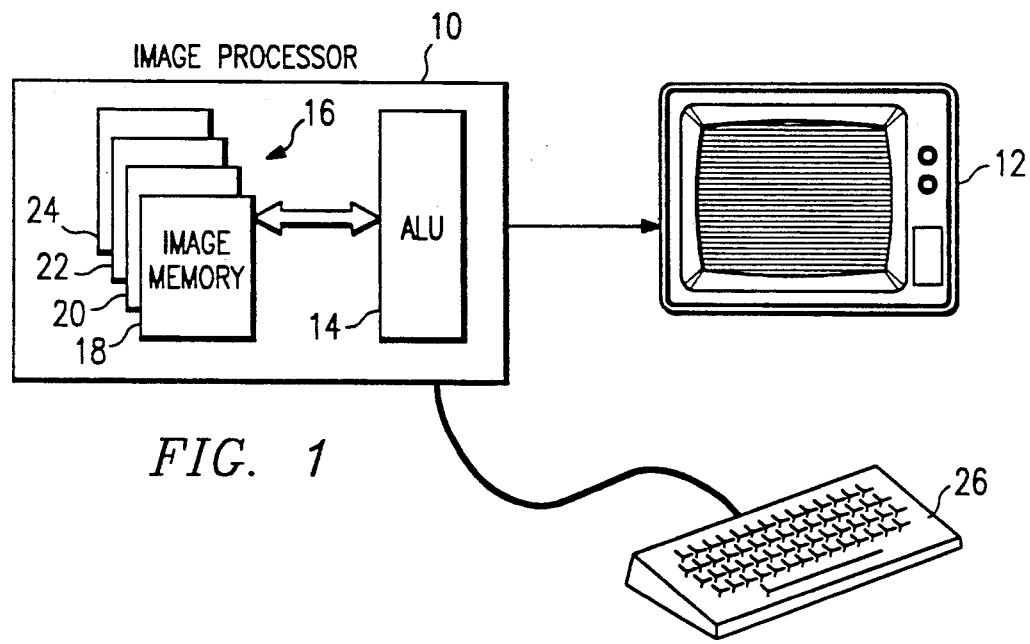
FIG. 1 illustrates in block diagram form image processing apparatus adapted for carrying out the method of the invention.

FIG. 1 illustrates image processing equipment adapted for carrying out the high-speed rendering technique of the invention. Shown is an image processor 10 for processing image data and presenting the same on a monitor 12 for viewing by an observer. The image processor 10 includes, among other circuits, an arithmetic logic unit (ALU) 14 coupled to an image memory 16. The ALU 14 may be of conventional design, or of highly sophisticated circuits, for processing image data supplied to it in the nature of pixel data. The pixel data, whether it be 8-bit or 16-bit words, are stored in the image memory 16 and are accessible by the ALU 14.

In the example depicted by FIG. 1, the image memory 16 includes a number of planes 18–24, each for storing a different type of image data. For example, image memory plane 18 may store image data corresponding to a red color intensity, while planes 20 and 22 may store respectively green and blue image intensity information. An overlay plane 24 may be utilized for storing other information, such as overlay or look-ahead data, as set forth in more detail below. Other types of memory structures may be employed with equal effectiveness to store all the image data necessary to carry out the rendering function. A keyboard 26 is typically associated with the image processor 10 to control the operations thereof and to provide different renderings of an image on the monitor 12. A high-speed image processor 10 adapted for operation according to the invention is described in more detail in co-pending U.S. Patent Application (commonly-owned by Assignee) entitled, "High Speed Image Processing Computer", by Pfeiffer et al. filed Sept. 14, 1987, Ser. No. 097,664, now U.S. Pat. No. 4,985,848, the disclosure of which is incorporated herein by reference.

Figure 2:
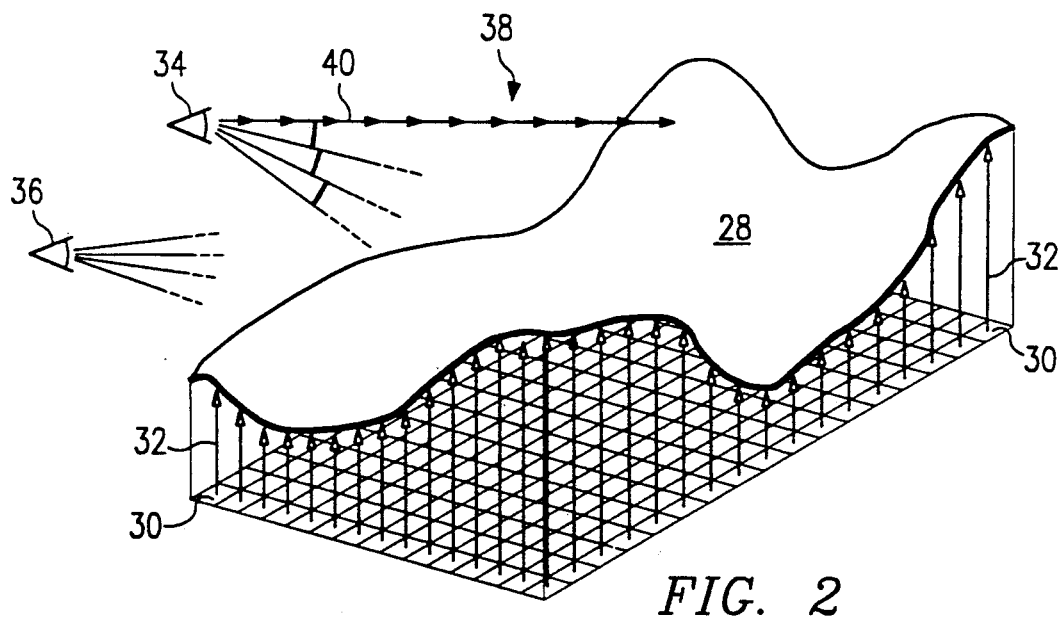
FIG. 2 illustrates image ray tracing employed in connection with a 2.5 dimensional elevation image.

In order to carry out rendering operations, the image memory typically is written by the processor to store reflective image data. For rendering two and one-half dimensional images, the image memory 16 stores amplitude or elevation information corresponding to each pixel location associated with the image. A destination image is also stored in the image memory 16. The pixel data of the destination image results from the rendering operation and comprises, for example, the perspective view of the image from the given spatial point 34 (FIG. 2). The destination image is transferred to the monitor 12 by the image processor 10. Specifically shown in FIG. 2 is the topography of a geographical object 28 which is to be rendered according to the various perspective views desired. Also illustrated are exemplary pixel locations 30 which are associated with elevation or amplitude arrows 32 which depict the elevation of the terrain 28 directly above each pixel location 30. Hence, each pixel location 30 stores binary data representative of the associated elevation of the geographical feature. Typically, image memory 16 comprises rows and columns of pixel storage locations 30 forming an array (e.g. 512×512).

The elevation data stored at each pixel location 30 can be developed using geographical data of the actual terrain, or by employing different photographs of a geographical area and triangulation techniques for arriving at the elevation of each section of the terrain. In any event, the manner in which image data can be developed to represent the elevation of a geographical terrain which is desired to be the subject matter of image processing and rendering it is well known in the art. With such image data information, rendering techniques can be employed to create different perspectives or views of the terrain 28 by processing the information stored at each pixel location 30. Without viewing the actual geographical terrain, the rendering operation can present to an observer via the monitor 12 a perspective view, for example, from the spatial point 34, 36 or any other point in the image space. As can be appreciated, the perspective view from point 34 will be different from that observed from point 36. Rendering of the image data provides the capability for viewing the perspectives of the geographical terrain 28 from the vantage points 34 or 36, or any other point in space. It is to be understood that while the example is described herein in terms of geographical terrain, any other image which can be characterized by elevation parameters can be processed and rendered accordingly.

In rendering an image using an image processor 10, a point 34 of particular interest in space is chosen as the vantage point. Because the elevation characteristics of the new perspective are not known with the respect to the chosen vantage point 34, conventional rendering is carried out by extending a number of rays, such as 38, from the spatial point 34, in an arcuate area from the point 34 to all points on the terrain 28. Each ray 38 is conventionally traversed in an incremental manner along the ray segments 40. As each ray segment 40 is traversed, the rendering algorithm checks to see whether the surface of the terrain 28 has been penetrated. In so doing, it is determined whether the elevation data stored at selected pixel locations corresponds to the spatial point of the ray segment. There are generally as many rays cast from the spatial point 34, as there exists pixel locations, i.e., 512×512=262,144. In addition, the number of calculations which must be executed by the image processor 10 is equivalent to the number of pixel locations times the total number of ray segments 40.

According to an important feature of the invention, the necessity for executing image data processing at each ray segment 40 is obviated by providing look-ahead images to determine the extent by which one can jump over a number of ray segments 40 to eliminate the processing thereof, while yet not penetrating the surface of the terrain 28.

The image data stored in the look-ahead image 24 comprises elevation information as viewed from a desired perspective, such as the spatial point 34. Conventional dilation algorithms are available for generating the look-ahead data with respect to a given spatial point. Essentially, such algorithms search for a maximum elevation value in a neighborhood around a ray segment, and more particularly seek a worst case elevation within, for example, a fixed radius around a ray segment. In the example noted above, a fixed circular radius for dilation purposes is not required, but only a pie-shaped or arcuate area, since the terrain object 28 can be viewed entirely from a small angular area in which all the rays extend from the spatial point 34 to any point on the surface of the terrain object 28.

Figure 3:
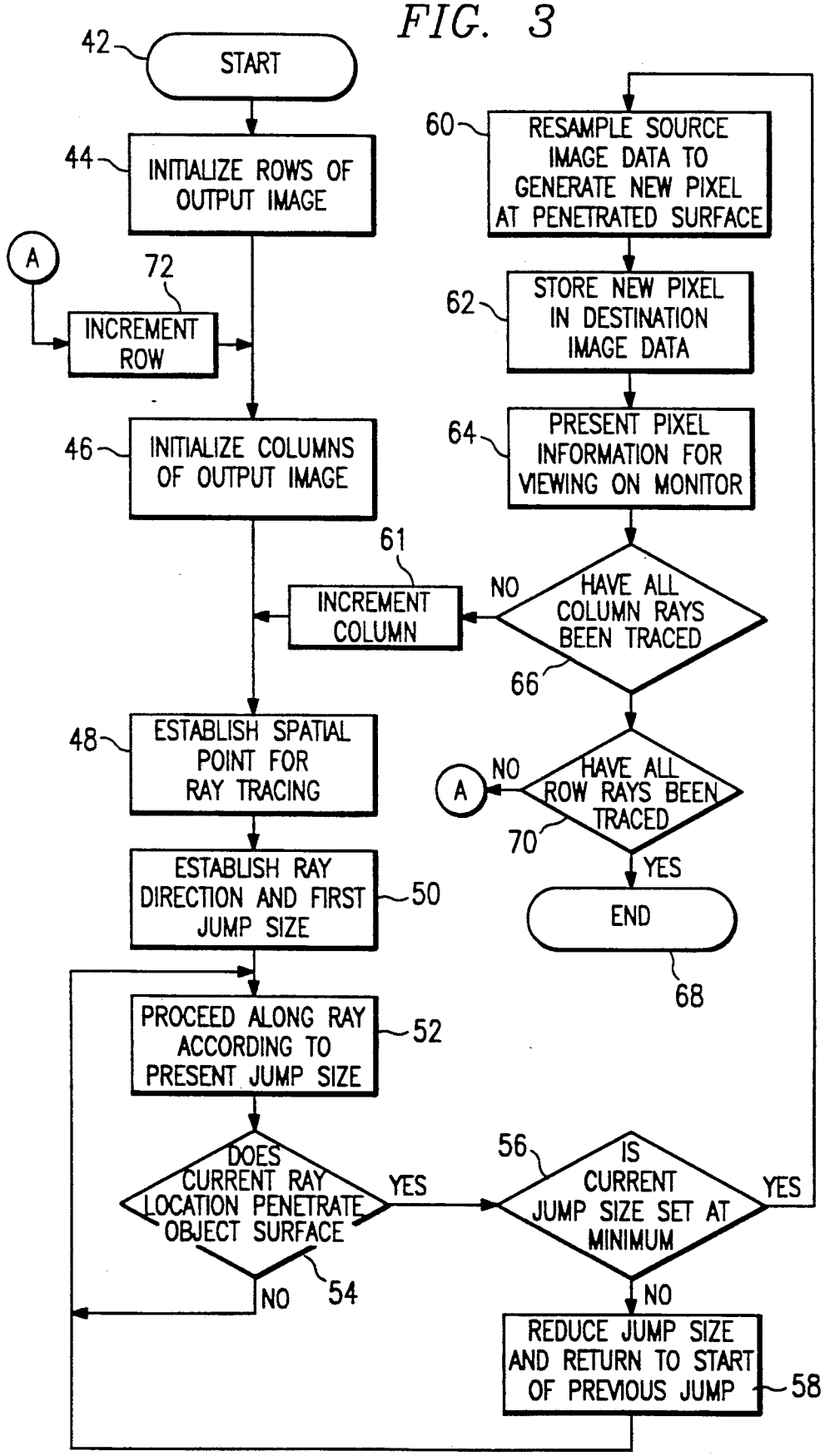
FIG. 3 illustrates a flow diagram of the major steps in carrying out the high-speed rendering operation of the invention using several fixed distance look-ahead images containing worst case elevation values in 2.5 dimensional rendering.

With reference now to FIG. 3, there is illustrated a flow chart of image processor operations for carrying out the high-speed rendering feature of the invention. At the outset, it should be clear that during the actual rendering operation, various types of image data and associated memory areas are utilized. For example, in 2.5 dimensional rendering, a reflective image is stored in the image memory 16, which image comprises an array of pixel locations storing the gray value intensity information of the source image. For color applications, three memory areas would be utilized to store red, green and blue data of the source image. An elevation image is also stored in the image memory 16 in an array of pixel locations an elevation image. Pixel locations of the elevation image have stored therein amplitude information of the source image. The amplitude data stored in the elevation image can be dilated according to conventional algorithms to generate data which is stored in one or more look-ahead images of the invention.

In the example set forth below, two new look-ahead images are utilized for storing elevation derived information, a first image corresponding to a first jump size along a ray trace, and a second look-ahead image for storing like information corresponding to a second smaller jump size along the ray trace. Of course, those skilled in the art may prefer to utilize other numbers of look-ahead images according to the invention. In a preferred embodiment of the invention, the elevation image is dilated to precalculate, with respect to each ray trace, the worst case or highest elevation in a given neighborhood. The neighborhood can be arbitrarily defined, such as a circle with a radius R, a pie-shaped area, or other shape suitable for the particular application.

According to the invention, the first look-ahead image is generated having dilated data yielding the highest elevation within sixty-four segments of a ray trace 38. A second look-ahead image is generated having information defining the highest elevation in sixteen segment steps of each ray trace 38. The information stored in the reflective image area of the image memory 16 can be utilized as a look-ahead image defining the highest elevation for each segment 40 of each ray trace 38. Hence, three effective look-ahead images are provided, two being generated by the noted dilate operations.

In FIG. 3, the rendering operation is commenced at a predefined processor starting point, such as shown by reference character 42. As depicted by rows 44 and columns 46, the look-ahead images are sequentially written with the dilated information for use during the rendering operation. The spatial point 34 (FIG. 2) is established for ray tracing by the interaction between an operator utilizing the keyboard 26 and the image processor 10 (FIG. 1). In other words, a spatial point, such as 34 or 36 (FIG. 2) is selected from which it is desired to obtain a perspective view of the terrain 28. This programmed operation is shown by reference character 48. Once a spatial point for ray tracing is selected, an angular direction of the first ray 38 is selected, as is a first jump size. This is shown in block 50 of the flow diagram. The first ray 38 selected may be arbitrary, but may be that which corresponds to the upper-leftmost ray which will strike the terrain 28. The first jump size according to the invention is selected as equivalent to sixty-four segments 40. That is, jumps in increments of 64 ray trace segments will be carried out according to such program block.

According to the image processing flow, and as noted in block 52, the image processor 10 jumps along the selected first ray 38, and particularly to the 64th segment thereof. The jump size of 64 ray segments was established according to the processing of block 50. With regard to decisional block 54, the image processor 10 is programmed to check whether or not any segment to the 64th ray segment penetrates the object of the terrain surface 28. This is accomplished by determining the vertical height or the Z-axis dimension corresponding to the spatial location of the 64th ray section. A mathematical subtraction is carried out between the noted Z-axis dimension and the elevation information stored in the pixel location associated with the 64th segment of the noted ray 38. If the object surface is not penetrated, control is branched back to block 52 where another large jump of 64 ray is executed.

The processor 10 continues testing every 64th ray segment to determine if the object surface has been penetrated, and if so, control is branched to block 56. Here, the processor 10 tests whether or not the current ray 38 tested corresponds approximately to the same height as the surface, or if indeed whether such ray has penetrated the surface. If the ray has indeed penetrated the surface of the object, i.e., does not correspond to the surface elevation at that point, the processor 10 continues to block 58, wherein the jump size is reduced and return is made back to block 52. In accordance with a preferred embodiment of the invention, the second jump size is established as sixteen ray segments. As noted above, the jump sizes are rather arbitrary, but can be predefined to optimize the rendering time according to the particular types of object or images being processed. As noted by block 58, the processor returns to the start of a jump point in which the object surface was penetrated, and then proceeds sixteen segments to conduct tests to determine whether the object surface has been penetrated (block 54).

In employing the rendering operation using reduced jump sizes, the second look-ahead image is utilized to determined whether or not a pertinent maximum elevation exists anywhere within a desired neighborhood of the current jump point. Again, if the object surface is penetrated during the current jump being processed, the jump size is again reduced, whereupon the processor 10 conducts the test of block 54 at each pixel location corresponding to each ray segment 40. In other words, the jump size is reduced to unity, and the elevation image is analyzed to determine the elevation data at each ray segment location.

Eventually, either during the 64, 16 or unity jump steps, one ray segment will correspond to the surface of the object 28, whereupon the processor 10 branches to program flow block 60. It can be appreciated that with the foregoing technique, processing is expedited as it is not necessary to carry out the determination of block 54 for each ray segment 40. For example, if indeed the 129th ray segment is coincident with the surface of the object 28, the processor 10 of the invention would execute only four tests according to program flow block 54 rather than the traditional 129 process calculations. In experiments, it has been found that image rendering according to the invention can be expedited by a factor of three to five times that of prior two and one-half dimensional rendering techniques. Rendering from a typical eye point slightly above the surface and directed toward the horizon achieves a speed-up of about three to four times with the technique of the invention. However, a restriction in which the eye points falls within a 45° range produces a five to six factor in the speed-up of all ray tracing from such eye points.

With regard to program flow block 60, the source or reflective image data is resampled to generate new pixel data which will be subsequently utilized to present the desired perspective view of the image during the rendering process. The resampling may involve an averaging or interpolation of the pixels in the neighborhood of the pixel of interest. As noted in program flow block 62, the resampled pixel is stored in the destination image for presentation on the monitor 12. The actual presentation, or reading of the destination image from the image memory 16 is carried out, as noted in block 64.

The foregoing illustrates the expedited tracing of a single ray 38 to determine the spatial location of surface of the object to be rendered. Each of the other rays is traced in a similar manner until all rays have been processed to redefine the desired perspective image of the object. When the last ray, has been traced, according to program blocks 66 and 70, the processor 10 proceeds to the exemplary end 68 of the operation.

The foregoing generalized technique can also be employed to expedite the rendering of three-dimensional objects. As is the case for 2.5 dimensional tracing, the look-ahead images may be generated in one of two formats.

In the first format, the look-ahead images can be generated by testing a volumetric group of source image pixels to determine if a pixel of interest exists within the chosen volume boundary constraints. If a determination in the negative is reached, the volumetric constraints are increased and another test is conducted for the existence of a pixel of interest. A pixel of interest depends on the image parameter to be emphasized, which may commonly be a pixel with a specified color range, opacity range, etc. In the event a pixel of interest is found within the volumetric image, the distance to that pixel of interest is noted and stored in the look-ahead image. The distance comprises the number of ray segments to jump to arrive at the closest pixel of interest in any direction.

In the second format, the look-ahead images are again generated along a ray within a volumetric neighborhood. However, here the tracing occurs at a set radium, and determines within that distance the most extreme pixel encountered. Once this distance is determined, it is then recorded into the look-ahead image.

Pixel extremity is a programmable parameter, such as height in a trace over a terrain source image, or other worst case points that may be encountered. The magnitude of the radium is set in decreasing increments and matches the distance of the jump along the tracing ray. For example, the initial span of the radium can be set at 64. Thus, from the immediate point along the ray there is a jump of 64 units down the ray, and at that point there is a spherical span of 64. If no point of extremity is encountered, the magnitude of 64 is recorded into the look-ahead image and the tracing will continue. If, however, an extreme point is encountered within that span, the jump and radium magnitude is decreased to 16, and the jump and span is repeated from the same immediate point along the ray. Again, if an extreme point is encountered, the magnitude will be stored but in a second look-ahead image. Thereafter, the magnitude will similarly decrease to 1 and a final span and look-ahead image input will occur.

Thus, the location of the most extreme pixel encountered within a fixed volumetric span is recorded into the look-ahead image. Therefore, rather than a pixel of interest as shown above, the pixel of maximum extreme within the defined volume is placed into the look-ahead image. This maximum extreme can be used to identify worst case points within the dilated volume.

Figure 4B:
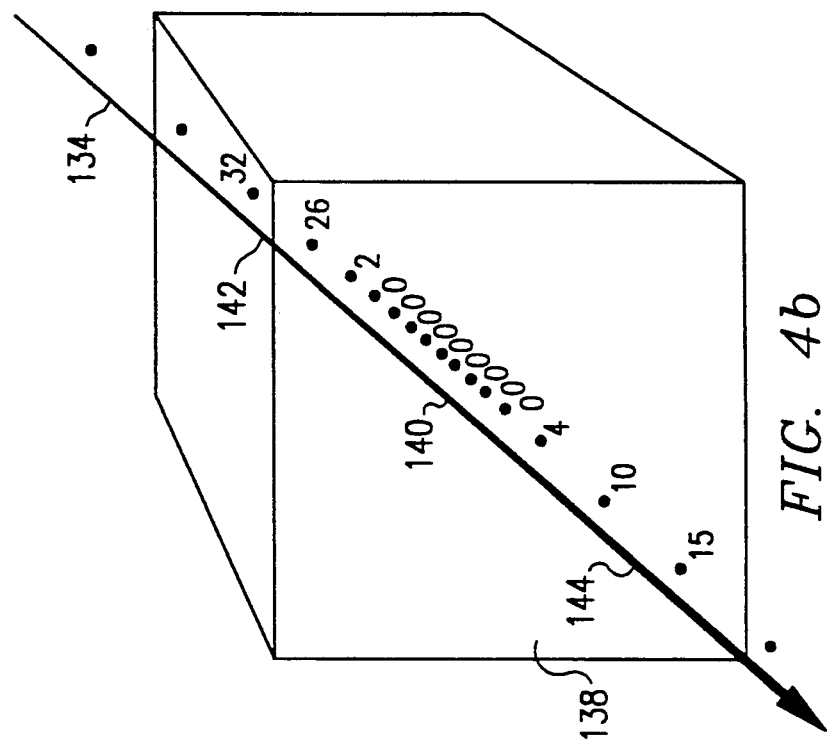
FIGS. 4a–4b illustrate image ray tracing employed in connection with a three dimensional image volume.
Figure 4A:
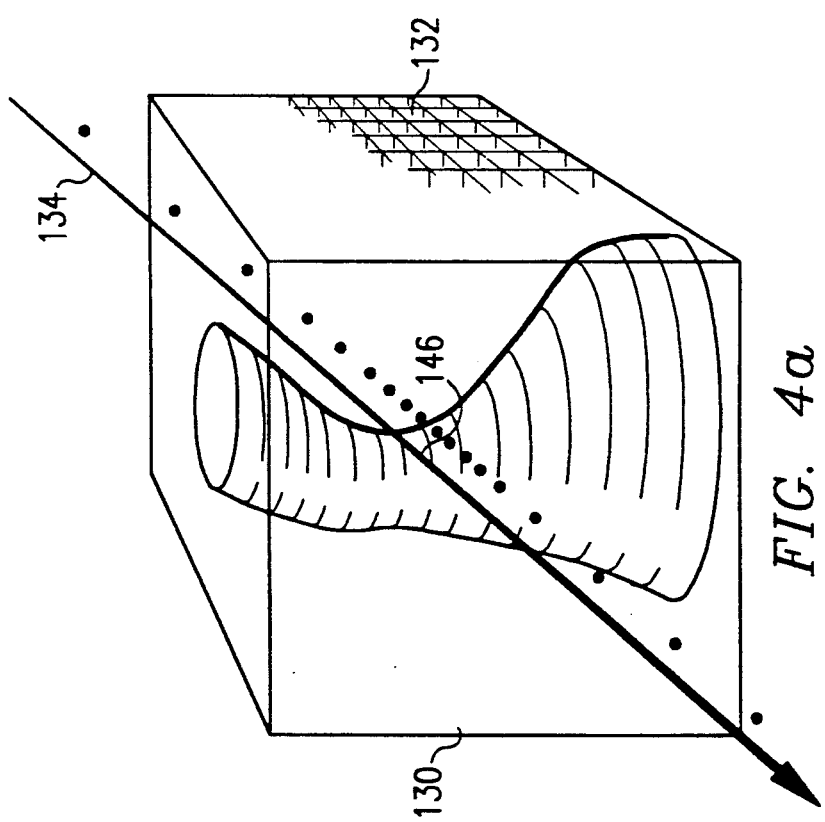

During rendering of a three dimensional source image, the image processor 10 (see FIG. 1) again establishes a spatial point of reference and a number of rays to be traced. In a preferred embodiment of the invention, the look-ahead image is configured to store the exact distance to the closest voxel of interest in any direction so that the processor 10 can jump directly to the nearest ray segment which may be associated with a voxel of interest. Such a distance look-ahead image is generated by examining successively larger spheres around each individual voxel in the original 3D reflective image. The smallest sphere around each 3D image voxel location which contains an interesting voxel has its radius placed in the corresponding location of the distance look-ahead image. If such distance exceeds a set maximum distance, then the set maximum is placed in the distance look-ahead image. Such a distance look-ahead image may be re-used during rendering from any perspective viewing position due to symmetry. Restriction of the spherical search above to the spherical equivalent of a pie-slice contains the usage of the distance look-ahead image to a certain range of viewing positions, but improves performance from those viewing positions. During the tracing of each ray, the distance look-ahead image is consulted to determine how many ray segments, if any, can be skipped without overlooking any voxels of interest. This determines the next point further down the ray to again consult the distance look-ahead image. When either the look-ahead image or the resampled voxel data indicates a valid reflective voxel, this voxel is processed according to a translucent rendering model, opaque rendering with illumination, or any such rendering technique common in the art today. This process automatically slows down to single-segment image ray tracing in neighborhoods of valid voxel data, and speeds up automatically as valid voxels are on the closeness of the current ray position to the nearest voxel of interest. The technique provides all valid voxel data to the voxel rendering process, and as such, makes no errors during acceleration of 3D image ray tracing. An example of three dimensional rendering to an interesting voxel is shown in FIG. 4a-b. A voxel is simply the name given to an image pixel in three dimensional analysis, and it is understood that the term "pixel" hereinafter comprises a two dimensional image pixel as well as a three dimensional voxel. In FIG. 4a-b, there is shown a ray 134 being traced through a source image volume 130. Within the source image volume 130 there are voxels 132 representing the source image 130. During tracing, there is a determination at each ray 134 iteration of whether there is an interesting voxel by consulting the corresponding location of the distance look-ahead image 138. When an interesting voxel is encountered, all voxels of interest are resampled and provided to the rendering process. The iteration continues by examining the next ray segment a single step further down the ray, which is checked for validity as usual. Note that as a valid voxel area is approached, the distance look-ahead image provides decelerating distances 142. As the valid voxel area is penetrated in the reflective image 146, the distance look-ahead image indicates valid voxel data by zero distances 140. As the valid voxel area is left, the distance look-ahead image provides accelerating distances 144 away from the area.

Figure 5:
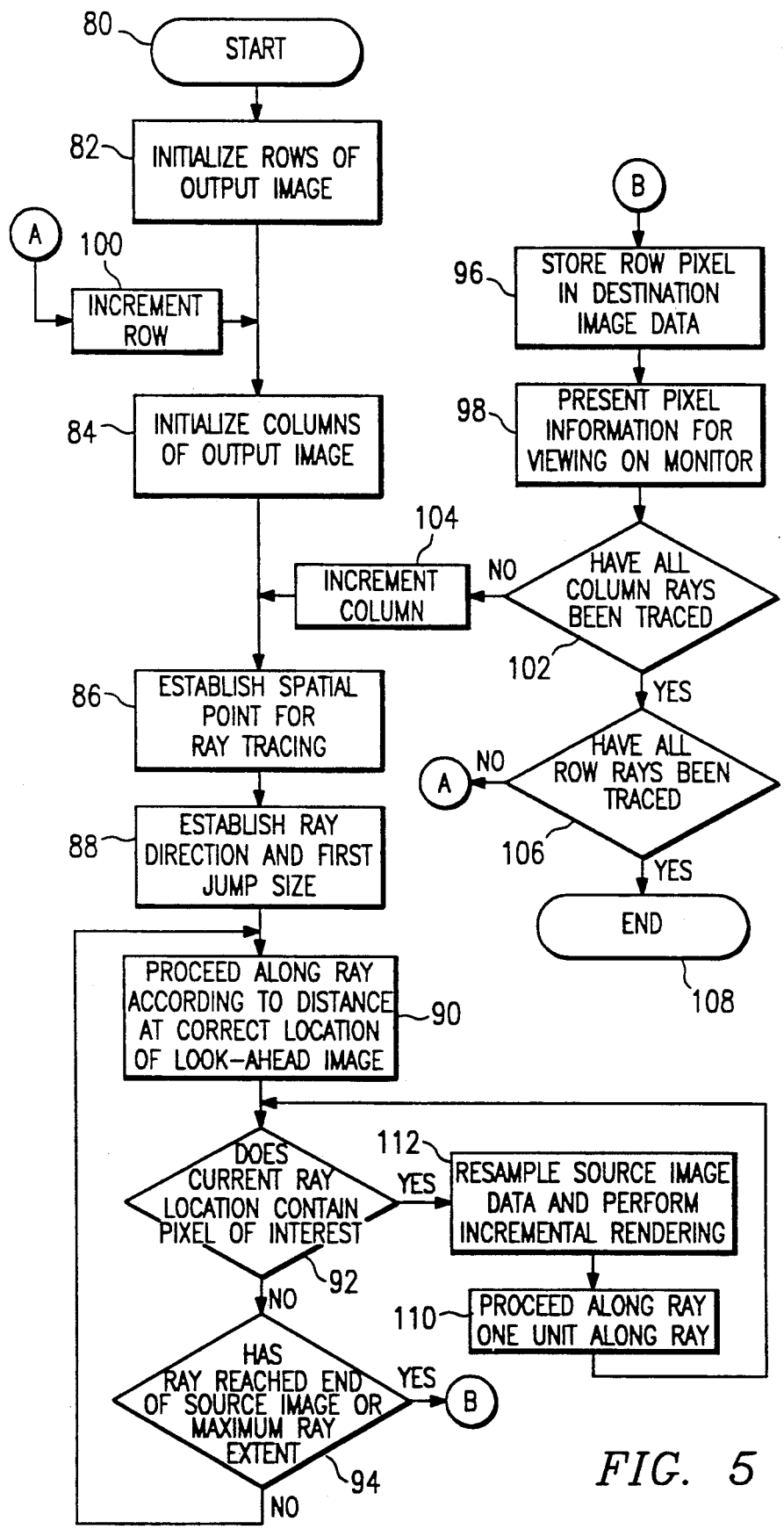
FIG. 5 illustrates a flow diagram of the major steps in carrying out the high-speed rendering operation of the invention with a single look-ahead image containing variable distances to a particular type or quality of pixels.

Other differences in rendering three dimensional source images will be apparent to those skilled in the art, and with the present disclosure, any programming alterations to accommodate three dimensional rendering can be readily recognized and implemented. In FIG. 5 there is shown a flow diagram of the major steps in carrying out the high-speed rendering operation of the invention with a look-ahead image containing variable distances to a particular type or quality of pixels. Rendering commences from a predefined processing starting point 80. Both the rows 82 and columns 84 of the output (i.e. look-ahead) image are rendered from an originating spatial point 86 in the direction of interest 88. The process proceeds along the ray 90 in accordance with the distance look-ahead images. Where no pixel of interest exists 92 the look-ahead image will so reflect and the process will continue along the ray 90 until an interesting pixel is encountered. Once, encountered, resampling and partial rendering occurs (block 122), with the next jump size set for a single segment forward along the ray 110. This process of invalid voxel skipping and occasional valid voxel resampling and rendering occurs iteratively until the 3D reflective image volume ends or the ray reaches a preset maximum extent 94. Note that this process may occur with image ray tracing back-to-front or front-to-back, depending on the rendering process used. When all valid voxel data has been resampled and rendered along a single ray, the information is stored 96 and displayed 98. The entire process continues until all row rays and column rays have been traced (blocks 102, 104, 100 and 106).

From the foregoing, disclosed are apparatus and a technique for providing high-speed rendering of new images from image data representative of other images. More particularly, disclosed is a technique for preprocessing image data to generate at least one look-ahead image for use in the actual rendering operation to eliminate unnecessary processing during the ray tracing step, thereby reducing the time by which the rendering operation can be carried out. The look-ahead images are shown to be of two kinds. In the first case the worst case values within a fixed distance for a fixed set of viewpoints are stored in each look-ahead image. The values may be voxel intensities, colors, elevations, opacities, gradients, or any arbitrary set of values associated with each voxel of the 3D reflective image. Multiple look-ahead images here correspond to different fixed distances for each look-ahead image. In the 2.5D terrain example, worst case elevations within fixed distances of 64, 16, and 1 pixel are stored in the look-ahead images.

This type of look-ahead image supports a rendering speed 3-4 times faster than conventional image ray tracing.

In another aspect of the invention, the distances to a fixed type or quality of voxel are stored in the look-ahead images. The type or quality of pixel is as fully general as mentioned above in the first case. Multiple look-ahead images here correspond to different fixed types of voxels for each look-ahead image. In the 3D volumetric rendering example, distances to an arbitrary set of voxels are stored in a single distance look-ahead image for rendering. This type of look-ahead image supports a rendering speed 20-30 times faster than conventional image ray tracing.

Either type of look-ahead image may be reformatted, summarized statistically, estimated, or otherwise transformed to a desired dimensionality without changing the essential nature or purpose of this data. The new form of the look-ahead data might be a 1D, 2D, or 3D array indexed by intensity, color, opacity, gradients, XYZ location, or any other index. For example, statistical summarization of the distances to white voxels in 3D might show that all black voxels in a particular 3D image were at least 29 voxel units away from the nearest white voxel. Performing this summarization for all grey values could produce a distance look-up table with a single look-ahead distance for each voxel intensity. Such an implementation requires less look-ahead image memory but sacrifices performance. This example supports a rendering speed 3-4 times faster than conventional image ray tracing.

With the preprocessing of the image data to eliminate unnecessary processing, whether in three or two and one-half dimensional rendering, a reduction of rendering time is realized. In any of the apparatus or methods such as the foregoing, many changes can be made which are not relevant to the novel features taught by the invention. Bearing this in mind, the specific embodiments disclosed herein are intended to be merely exemplary of the invention and not restrictive thereof since various modifications readily apparent to those familiar with the art can be made without departing from the spirit and scope of the invention as claimed below.

What is claimed is:

1. A method for providing a high-speed rendering of a new image from image data representative of an old image, comprising the steps of:

defining a spatial point of perspective so that the old image can be rendered and thereby produce a new image;

preprocessing the image data by ray tracing to produce at least one look-ahead image having stored therein pixel data of interest utilized during rendering to increase the speed thereof;

performing said rendering by image ray tracing and referring to said look-ahead image to eliminate processing where pixel image data of interest does not exist; and storing in said look-ahead image information concerning worst case values of any quality of a pixel within a fixed distance.

2. The method of claim 1, further including preprocessing the image data to produce a plurality of look-ahead images, each storing information concerning different sized jumps along each said ray.

3. The method of claim 1, further including storing information in said look-ahead image concerning highest elevation data associated with said old image which is within a predefined number of pixels.

4. The method of claim 1, further including storing in said look-ahead image information concerning a predefined color range within a given area.

5. The method of claim 1, further including storing in said look-ahead image information concerning a predefined color range within a given volume.

6. The method of claim 1, wherein said pixel comprises a voxel.

7. The method of claim 1 wherein said one look-ahead image comprises a reformatted image of a desired dimensionality.

8. The method of claim 1 wherein said one look-ahead image comprises a statistically summarized image of a desired dimensionality.

9. The method of claim 1 wherein said one look-ahead image comprises an estimated version of an image of a desired dimensionality.

10. The method of claim 1 wherein said one look-ahead image is indexed by a selected index characteristic.

11. The method of claim 10 wherein said selected index characteristic comprises intensity.

12. The method of claim 10 wherein said selected index characteristic comprises color.

13. The method of claim 10 wherein said selected index characteristic comprises opacity.

14. The method of claim 10 wherein said selected index characteristic comprises spatial XYZ location.

15. The method of claim 1 further including storing in said look-ahead image information regarding a selected derivation of pixel characteristics.

16. The method of claim 15 wherein said characteristic comprises intensity.

17. The method of claim 15 wherein said characteristic comprises color.

18. The method of claim 15 wherein said characteristic comprises opacity.

19. The method of claim 15 wherein said characteristic comprises spatial XYZ location.

20. The method of claim 15 and further comprising storing a derivative of said selected derivation of pixel characteristics.

21. The method of claim 20 wherein said derivative is performed by imaging transform.

22. The method of claim 21 wherein said imaging transform comprises point operation.

23. The method of claim 21 wherein said imaging transform comprises gradients.

24. The method of claim 21 wherein said imaging transform comprises convolution.

25. The method of claim 1, further including storing in said look-ahead image information concerning a distance to any particular quality of a pixel.

26. The method of claim 1, further including preprocessing said image data to generate multiple look-ahead images and storing in a first said look-ahead image information concerning a pixel of interest within a given boundary area, and storing in other look-ahead images a pixel of interest within a smaller given boundary area.

27. The method of claim 1, further including storing in said look-ahead image information concerning whether or not pixel data of interest exists within a specified boundary of each said ray.

28. Apparatus for providing a high-speed rendering of a new image from image data representative of an old image, comprising:

means for defining a spatial point of perspective so that the old image can be rendered and thereby produce a new image;
  means for processing the image data by ray tracing to produce at least one look-ahead image having stored therein pixel data utilized during rendering to increase the speed thereof;
  means for carrying out said rendering by tracing each said ray and referring to said look-ahead image to eliminate processing where pixel image data of interest does not exist; and
  means for storing in said look-ahead image information concerning worst case values of any quality of a pixel within a fixed distance.

29. A method for providing a high-speed rendering of a new image from image data representative of an old image, comprising the steps of:

generating a look-ahead image by dilating image data to determine the existence of a pixel of interest within a given boundary area;
  rendering said new image by ray tracing techniques and by referring to said look-ahead image so that pixels of no interest along said ray are not processed, thus enhancing the speed of said rendering; and
  proceeding along each ray in different jump sizes so that pixels of no interest are skipped over by executing initial large jumps, and if as a result thereof a pixel of interest is skipped over, executing jumps of smaller size.

30. The method of claim 29, further including consulting look-ahead images to determine whether pixels of interest lie within a jump to be executed.

31. The method of claim 29, wherein said pixel comprises a voxel.

32. Apparatus for providing a high-speed rendering of a new image from image data representative of an old image, comprising:

means for generating a look-ahead image by dilating image data to determine the existence of a pixel of interest within a given boundary area;
  means for rendering said new image by ray tracing techniques and by referring to said look-ahead image so that pixels of no interest along said ray are not processed, thus enhancing the speed of said rendering; and
  means for proceeding along each said ray in different jump sizes so that pixels of no interest are skipped over by executing initial large jumps, and if as a result thereof a pixel of interest is skipped over, executing jumps of smaller size.

33. In an image rendering process in which ray tracing is employed to generate a new image from an old image, an improved method comprising the steps of:

generating before said rendering a look-ahead image to determine pixels of interest within a given boundary area;
  skipping through said boundary area during said ray tracing if no pixel of interest exists to thereby enhance the speed of said rendering process; and
  rendering said image by first consulting a first look-ahead image having a first boundary area, and secondly consulting a second look-ahead image having a smaller boundary area if a pixel of interest exists in the first boundary area as defined by said first look-ahead image.

34. The method of claim 33, further including generating a plurality of said look-ahead images, each having a different sized boundary area.

35. The method of claim 33, wherein said pixel comprises a voxel.

36. The method of rendering a source image comprising an array of image data elements, comprising the steps of:
generating a look-ahead image comprising an array of distance data elements each representing a distance between a corresponding image data element and an image data element of interest; and
determining a nearest image data element of interest in a predetermined direction from a desired image data element by jumping in said predetermined direction to successive elements in the source image responsive to distance data stored in respective successive elements of said look-ahead image.

37. The method of claim 36, wherein the source array and the look-ahead array are three dimensional.

38. The method of claim 36, wherein the source array and the look-ahead array are 2.5 dimensional.

39. The method of claim 36, wherein each of the image data elements comprises a voxel.

40. The method of rendering a source image comprising an array of image data elements, comprising the steps of:
generating a look-ahead image comprising an array of elements each representing an image data extreme within a predetermined radial distance from a corresponding image data element; and
determining a nearest image data element of interest in a predetermined direction from a desired image data element by jumping said predetermined radial distance in said predetermined direction to successive elements of said source image until said look-ahead image indicates that an element of interest is within said predetermined radial distance.

41. The method of claim 40 and further comprising the step of generating a second look-ahead image associated with a shorter predetermined radial distance.

42. The method of claim 41 and further comprising the step of selecting the second look-ahead image in response to an indication of an element of interest within the predetermined radial distance of the first look-ahead image.

43. The method of claim 40 wherein the step of generating includes the step of dilating the source image.

44. The method of claim 40 wherein the source array and the look-ahead array are three dimensional.

45. The method of claim 40 wherein the source array and the look-ahead array are 2.5 dimensional.

46. The method of claim 40 wherein each of the image data elements comprises a voxel.

47. The method of claim 40 wherein the image data extreme comprises a worst case value of an image data element.

48. The method of claim 40 wherein the image data extreme comprises a highest value of elevation.

49. The method of claim 40 wherein the image data extreme comprises a value of a predefined color range.

50. The method of claim 40 wherein the image data extreme comprises a selected derivation of at least one characteristic regarding the image data elements.

51. An apparatus for rendering a source image comprising an array of image data elements, comprising:
means for generating a look-ahead image comprising an array of distance data elements each representing a distance between a corresponding image data element and an image data element of interest; and
means for determining a nearest image data element of interest in a predetermined direction from a desired image data element by jumping to successive elements in the source image responsive to distance data stored in respective successive elements of said look-ahead image.

52. The apparatus of claim 51 wherein said source and look-ahead arrays are three dimensional.

53. The apparatus of claim 51 wherein said source and look-ahead arrays are 2.5 dimensional.

54. An apparatus for rendering a source image comprising an array of image data elements, comprising:
means for generating a look-ahead image comprising an array of elements each representing an image data extreme within a predetermined radial distance from a corresponding image data element; and
means for determining a nearest image data element of interest in a predetermined direction from a desired image data element by jumping said predetermined radial distance in said predetermined direction to successive elements of said source image until said look-ahead image indicates that an element of interest is within said predetermined radial distance.

55. The apparatus of claim 54 and further comprising means for generating a second look-ahead image associated with a shorter predetermined radial distance.

56. The apparatus of claim 55 and further comprising means for selecting the second look-ahead image in response to an indication of an element of interest within the predetermined radial distance of the first look-ahead image.

57. The apparatus of claim 54 wherein said source and look-ahead images are 2.5 dimensional.

58. The apparatus of claim 54 wherein said source and look-ahead images are three dimensional.

* * * * *